US009815553B2

(12) United States Patent
McCollough et al.

(10) Patent No.: US 9,815,553 B2
(45) Date of Patent: Nov. 14, 2017

(54) INDEPENDENT HYDRAULIC CONTROL SYSTEM FOR ROTORCRAFT SECONDARY ROTOR

(71) Applicant: Bell Helicopter Textron Inc., Fort Worth, TX (US)

(72) Inventors: James M. McCollough, Arlington, TX (US); Carlos A. Fenny, Arlington, TX (US)

(73) Assignee: Bell Helicopter Tectron Inc., Fort Worth, TX (US)

( * ) Notice: Subject to any disclaimer, the term of this patent is extended or adjusted under 35 U.S.C. 154(b) by 445 days.

(21) Appl. No.: 13/932,407

(22) Filed: Jul. 1, 2013

(65) Prior Publication Data

US 2015/0001337 A1   Jan. 1, 2015

(51) Int. Cl.
*B64C 27/00* (2006.01)
*B64C 27/78* (2006.01)
*B64C 27/54* (2006.01)
*B64C 27/82* (2006.01)
*B64C 27/64* (2006.01)

(52) U.S. Cl.
CPC .............. *B64C 27/78* (2013.01); *B64C 27/54* (2013.01); *B64C 27/64* (2013.01); *B64C 27/82* (2013.01)

(58) Field of Classification Search
CPC ......... B64C 27/82; B64C 27/54; B64C 27/78; B64C 27/64
USPC ......... 244/17.21, 17.23, 17.19, 17.11, 17.13, 244/99.2, 99.7, 226, 78.1, 78.2
See application file for complete search history.

(56) References Cited

U.S. PATENT DOCUMENTS

| | | | | |
|---|---|---|---|---|
| 3,065,799 A * | 11/1962 | McCarty, Jr. | | 416/23 |
| 3,176,774 A * | 4/1965 | Krinsky | | 416/130 |
| 3,558,081 A * | 1/1971 | Williams | | 244/17.19 |
| 4,243,358 A * | 1/1981 | Carlock et al. | | 416/114 |
| 4,379,678 A * | 4/1983 | Carlock et al. | | 416/98 |
| 5,188,511 A * | 2/1993 | Ebert | | 416/25 |
| 5,597,138 A * | 1/1997 | Arlton et al. | | 244/17.13 |
| 5,607,122 A * | 3/1997 | Hicks et al. | | 244/17.19 |
| 6,099,254 A * | 8/2000 | Blaas et al. | | 416/114 |
| 6,142,413 A * | 11/2000 | Dequin et al. | | 244/17.13 |
| 7,890,222 B1 * | 2/2011 | Shultz et al. | | 701/3 |
| 8,032,269 B2 * | 10/2011 | Cherepinsky et al. | | 701/14 |

(Continued)

FOREIGN PATENT DOCUMENTS

| | | | | |
|---|---|---|---|---|
| GB | 698031 | * | 10/1953 | ........... G05D 1/0858 |
| GB | 698031 A | | 10/1953 | |
| GB | 2274634 A | * | 8/1994 | ............. B64C 27/78 |

OTHER PUBLICATIONS

European Search Report in related European Application No. 13195175.8, dated Mar. 5, 2014, 3 pages.

(Continued)

*Primary Examiner* — Assres H Woldemaryam

(57) ABSTRACT

According to some embodiments, a rotorcraft includes a secondary rotor control system located proximate to the empennage of the rotorcraft. The secondary rotor control system includes at least one hydraulic pump and at least one hydraulic actuator. The at least one hydraulic pump is located proximate to the empennage. The at least one hydraulic actuator is located proximate to the empennage and configured to adjust at least one operating characteristic of the at least one secondary rotor blade.

15 Claims, 4 Drawing Sheets

(56) References Cited

U.S. PATENT DOCUMENTS

2002/0005456 A1* 1/2002 Toulmay .................... 244/17.13
2008/0169379 A1 7/2008 Cotton et al.
2008/0185476 A1* 8/2008 Suisse et al. ................ 244/78.1
2009/0229694 A1* 9/2009 Fenny et al. ............. 137/625.63
2009/0269199 A1* 10/2009 Rudley et al. ................ 416/113
2011/0121128 A1* 5/2011 Balkus, Jr. ................ 244/17.21

OTHER PUBLICATIONS

Official Action in related European Application No. 13195175.8, dated Mar. 17, 2014, 5 pages.
Official Action in related European Application No. 13195175.8, dated Oct. 12, 2014, 5 pages.

\* cited by examiner

INDEPENDENT HYDRAULIC CONTROL SYSTEM FOR ROTORCRAFT SECONDARY ROTOR

TECHNICAL FIELD

This invention relates generally to rotorcraft anti-torque systems, and more particularly, to an independent hydraulic control system for a rotorcraft secondary rotor.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to improve rotorcraft safety. Another technical advantage of one embodiment may also include the capability to improve rotorcraft ballistic tolerance. Yet another technical advantage of one embodiment may also include the capability to reduce weight and control hysteresis of a tail rotor control system. Yet another technical advantage of one embodiment may also include the capability to separate secondary rotor control system failures from the main rotor control system.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
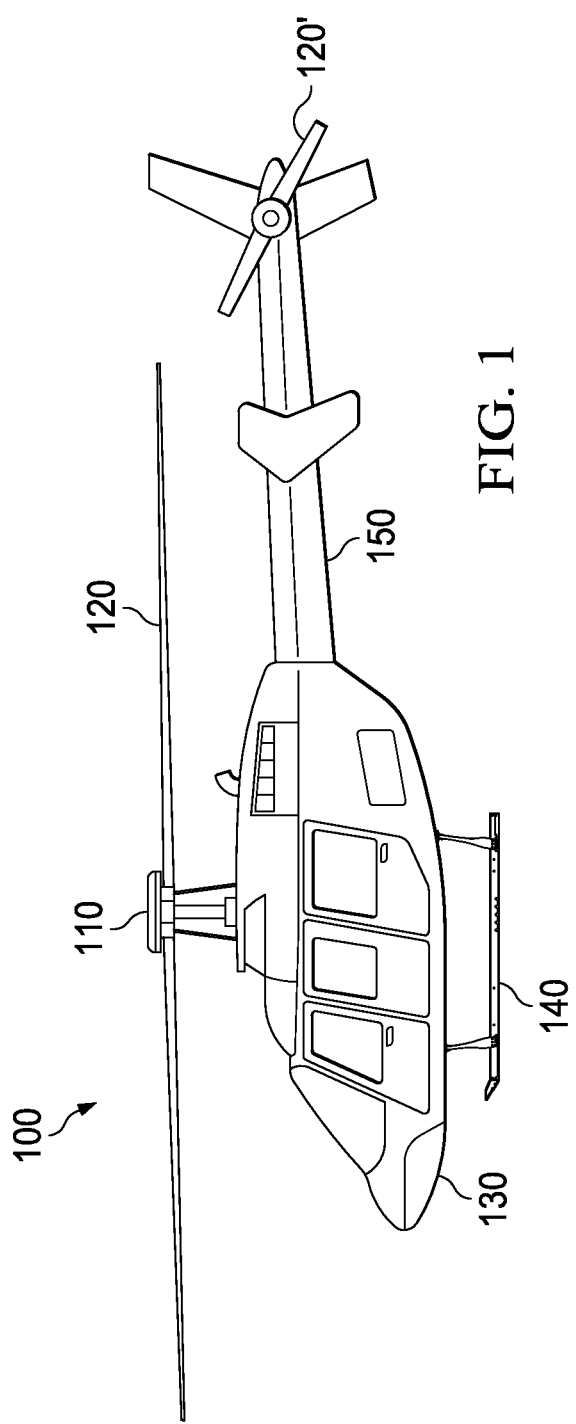
FIG. 1 shows a rotorcraft according to one example embodiment.

FIG. 1 shows a rotorcraft 100 according to one example embodiment. In the example of FIG. 1, rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments recognize that blades 120' may represent one example of a secondary rotor system; other examples may include, but are not limited to, forward-thrust propellers (e.g., pusher propellers, tractor propellers, etc.), tail anti-torque propellers, ducted rotors, and ducted fans mounted inside and/or outside the rotorcraft.

Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples. In some embodiments, rotorcraft 100 may include a variety of additional components not shown in FIG. 1. For example, rotor system 110 may include components such as a power train, drive shafts, a hub, a swashplate, and pitch links.

Figure 2:
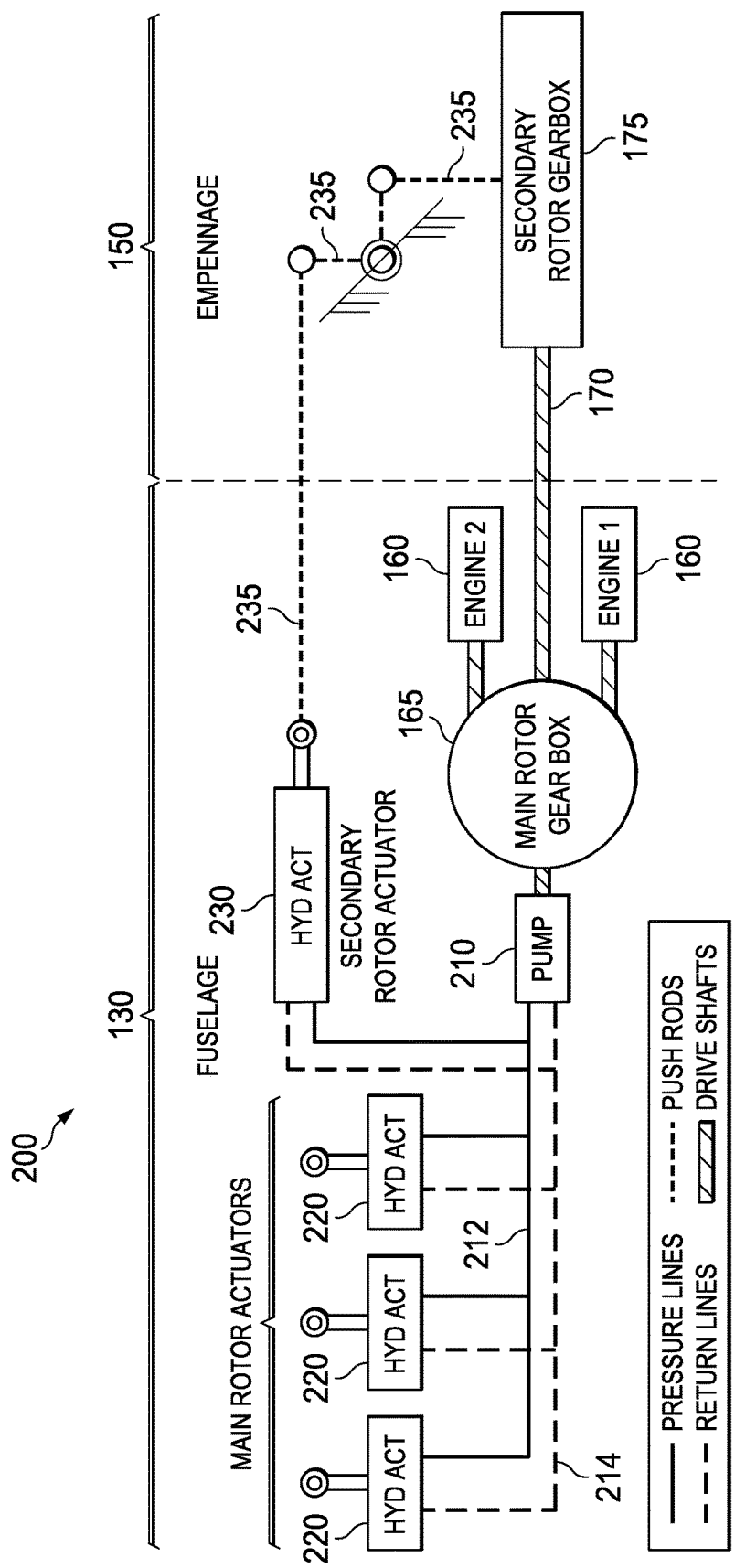
FIGS. 2 and 3 show two example rotor control systems.
Figure 3:
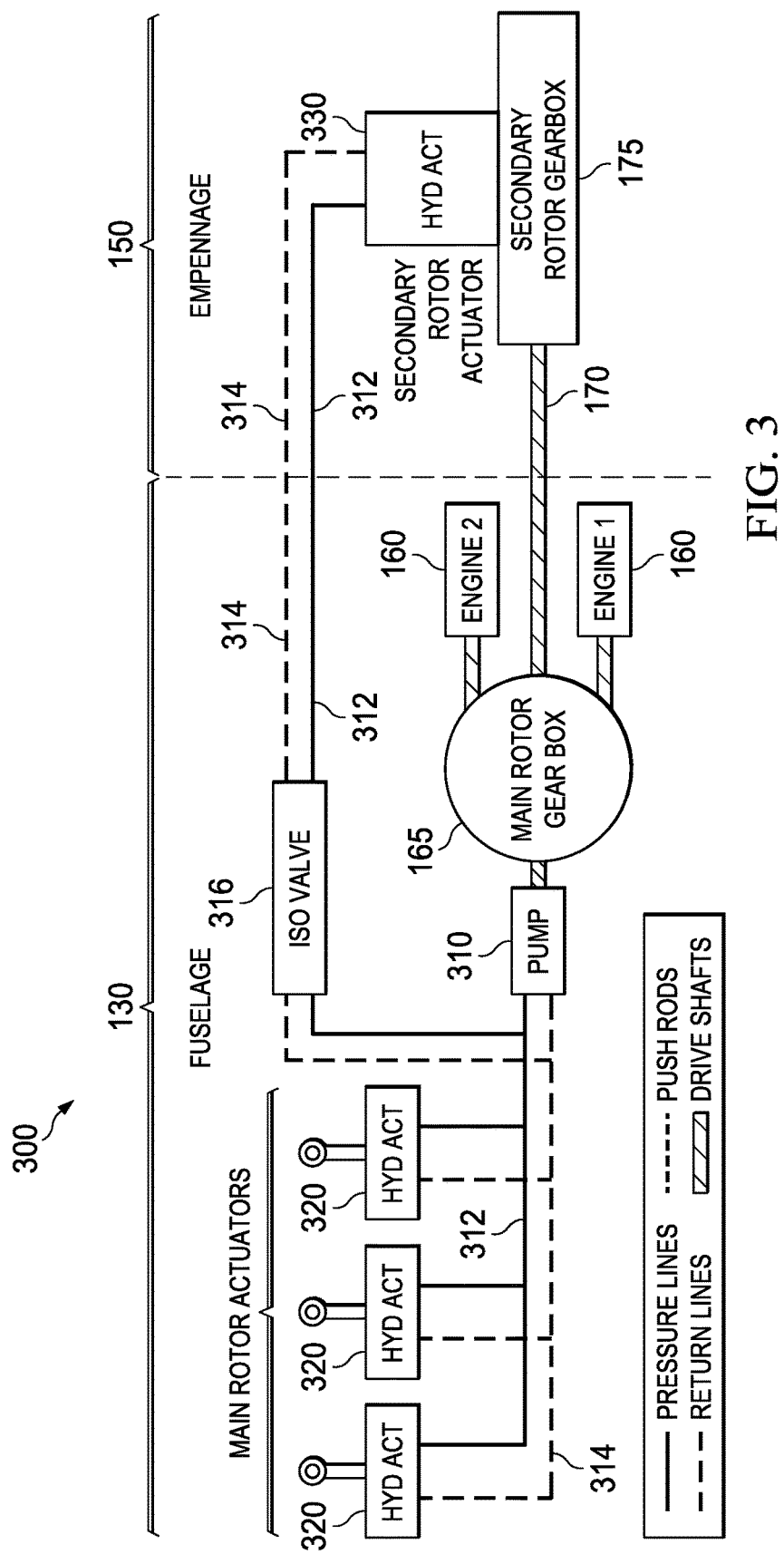
Figure 4:
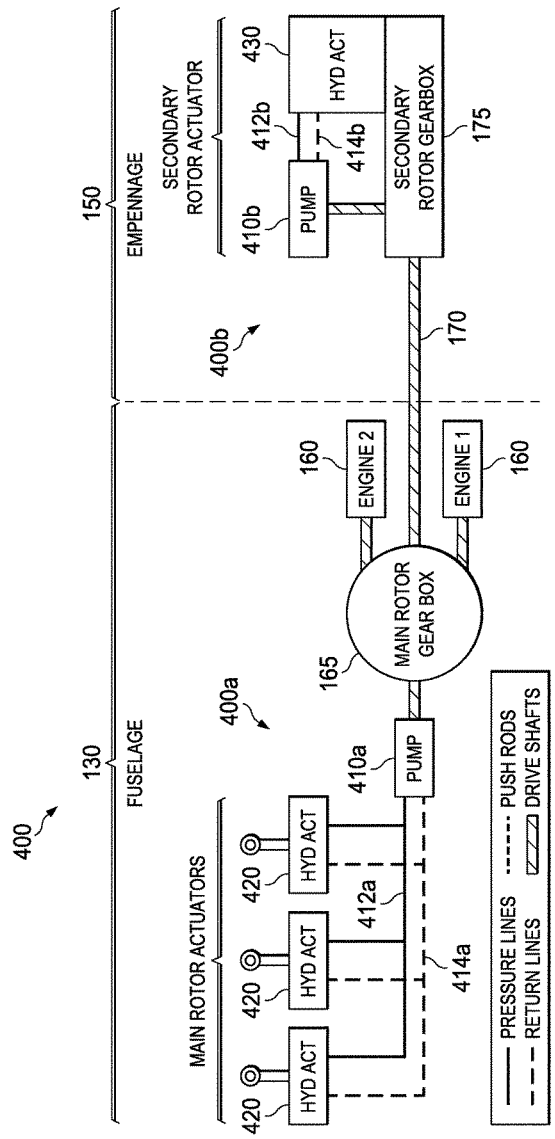
FIG. 4 shows a rotor control configuration with independent main rotor and secondary rotor hydraulic control systems according to one example embodiment.

In the example of FIG. 1, rotor system 110 provide power from the engines to main rotor blades 120 and tail rotor blades 120' through a combination of drive shafts, gear boxes (e.g., transmissions), and other components. In some example embodiments (as shown in FIGS. 2-4), engines 160 provide power through a main rotor gear box 165 to a rotating mast in mechanical communication with blades 120. In addition, a drive shaft 170 may provide power to a secondary rotor gear box 175 (e.g., a 90-degree gear box), which may transmit power to blades 120'. In these example embodiments, main rotor gear box 165 may be proximate to fuselage 130, secondary rotor gear box 175 may be proximate to empennage 150, and drive shaft 170 may be proximate to fuselage 130 and/or empennage 150 (e.g., extending from main rotor gear box 165 proximate to fuselage 130 to secondary rotor gear box 175 proximate to empennage 150). As used throughout, location terms such as "proximate to" may indicate representative or relative locations of an object. For example, main rotor gear box 165 may be proximate to fuselage 130 if positioned within fuselage 130, adjacent fuselage 130, or otherwise in a location associated with fuselage 130.

FIG. 2 shows an example rotor control system 200. In the example of FIG. 2, rotor control system 200 features a hydraulic pump 210, hydraulic pressure lines 212, hydraulic return lines 214, main rotor hydraulic actuators 220, and a secondary rotor hydraulic actuator 230, all located proximate to fuselage 130. A series of push rods 235 extend from secondary rotor hydraulic actuator 230 proximate to fuselage 130 to secondary rotor gear box 175 proximate to empennage 150. The example rotor control system 200 of FIG. 2, however, may offer limited secondary rotor controllability due to system 200's reliance on push rods to control the secondary rotor system. In addition, high-boosted loads on the long push rods 235 may increase weight and control hysteresis.

FIG. 3 shows an example rotor control system 300. The example rotor control system 300 may offer improved controllability as compared to system 200 by providing a hydraulic actuator 330 proximate to empennage 150. The example of FIG. 3 also features a hydraulic pump 310, hydraulic pressure lines 312, hydraulic return lines 314, an isolation valve 316, and main rotor hydraulic actuators 320, all located proximate to fuselage 130. The example rotor control system 300 also features hydraulic pressure lines 312 and hydraulic return lines 314 that extend from hydraulic pump 310 proximate to fuselage 130 to secondary rotor hydraulic actuator 330 proximate to empennage 150.

The example rotor control system 300 of FIG. 3 may provide flight controls to both the main rotor system and a secondary rotor system. As a result, a single failure may render rotor control system 300 to provide either main rotor flight controls or secondary rotor flight controls. For example, if rotorcraft 100 suffers tail damage (e.g., by flying into an object or receiving gunfire during a conflict), hydraulic pressure lines 312 located in empennage 150 may become damaged and begin leaking hydraulic fluid. In this example, a loss in fluid pressure may render rotor control system 300 unable to provide main rotor system flight controls as a result of damage to empennage 150. Although a complex system of sensors and valves may be installed to isolate leakage from damaged hydraulic lines, such a system may increase weight and be subject to its own failure risks.

Accordingly, teachings of certain embodiments recognize the capability to provide a separate secondary rotor control system that operates independently of a rotorcraft's main rotor control system. Teachings of certain embodiments recognize that providing separate rotor control systems may separate failure modes and improve rotorcraft performance.

FIG. 4 shows an example rotor control configuration 400 according to one example embodiment. The example configuration 400 of FIG. 4 features two independent hydraulic control systems: a main rotor control system 400*a* and a secondary rotor control system 400*b*. Main rotor control system 400*a* features a hydraulic pump 410*a*, hydraulic pressure lines 412*a*, hydraulic return lines 414*a*, and main rotor hydraulic actuators 420, all located proximate to fuselage 130. Secondary rotor control system 400*b* features a hydraulic pump 410*b*, hydraulic pressure lines 412*b*, hydraulic return lines 414*b*, and a secondary rotor hydraulic actuator 430, all located proximate to empennage 150. In the example of FIG. 4, drive shaft 170 extends from main rotor gear box 165 (which may be in mechanical communication with the drive train) and provides power to hydraulic pump 410*b* and secondary rotor gear box 175.

In operation, according to one example embodiment, a flight control system may send flight control commands to main rotor control system 400*a* and/or secondary rotor control systems 400*b*. In this example embodiment, the flight control system may represent a mechanical flight control system providing instructions in the form of a mechanical input or may represent a fly-by-wire flight control system providing instructions in the form of an electrical signal. Upon receiving a flight control instruction, hydraulic pump 410*a* of main rotor control system 400*a* may provide hydraulic fluid to one or more of hydraulic actuators 420, which may adjust at least one operating characteristic of at least one main rotor blade 120 (e.g., adjusting a pitch angle of the at least one main rotor blade 120 may implementing a cyclic or collective input). Likewise, upon receiving a flight control instruction, hydraulic pump 410*b* of secondary rotor control system 400*b* may provide hydraulic fluid to secondary hydraulic actuator 430, which may adjust at least one operating characteristic of at least one secondary rotor blade 120' (e.g., adjusting a pitch angle of the at least one second rotor blade 120').

In some embodiments, hydraulic pump 410*b* is integrated with secondary rotor gear box 175 (e.g., integrated with a 90-degree gear box or an intermediate gear box). For example, secondary rotor gear box 175 may feature an integral hydraulic pump powered by drive shaft 170 and an integral secondary rotor hydraulic actuator 430 (e.g., an integral hydraulic cylinder tail-rotor boost actuator). Although integrating equipment such as a hydraulic pump 410*b* and a secondary rotor hydraulic actuator 430 into secondary rotor gear box 175 may appear to increase gear box weight and complexity, teachings of certain embodiments recognize the capability to efficiently such equipment into the secondary rotor gear box 175. For example, in some embodiments, gear box and pump efficiency may be improved by using the working lubrication/hydraulic fluid used by hydraulic pump 410*b* to lubricate secondary rotor gear box 175. To prevent potential actuator leakage from depleting the gear box sump due to an overboard leak, the pump section inlet may be elevated above the bottom of the sump to insure a minimum acceptable level of fluid for lubrication and cooling is retained.

In addition, although adding equipment such as a hydraulic pump 410*b* to empennage 150 may appear to increase the weight of configuration 400, teachings of certain embodiments recognize that adding hydraulic pump 410*b* as part of an independent secondary rotor control system may actually reduce the weight of configuration 400 as compared to systems 200 and 300 discussed with regards to FIGS. 2 and 3. For example, providing an independent secondary rotor control system such as system 400*b* may eliminate the need for heavy push rods and hydraulic lines extending between the fuselage 130 and the empennage 150.

Furthermore, teachings of certain embodiments recognize that hydraulic pump 410*b* may be smaller and lighter than hydraulic pump 410*a*, thus reducing the amount of weight added to empennage 150. Teachings of certain embodiments recognize that a smaller hydraulic 410*b* may be used, for example, because secondary rotor control system 400*b* may operate at a lower hydraulic pressure than main rotor control system 400*a* because the secondary rotor system may require less actuation force than the main rotor system. In one example embodiment, main rotor control system 400*a* may maintain an operating pressure on the order of 3000 pounds per square inch (PSI) to supply sufficient actuation force to control the main rotor system, whereas secondary rotor control system 400*b* may only need an operating pressure on the order of 600 PSI to supply sufficient actuation force to control the secondary rotor system.

Accordingly, teachings of certain embodiments recognize the capability to separate failure modes and improve rotorcraft performance by providing separate rotor control systems such as systems 400*a* and 400*b*. For example, a hydraulic fluid leak in secondary rotor control system 400*b* may not cause a failure in main rotor control system 400*a* because system 400*a* is not in fluid communication with system 400*b*. In fact, secondary rotor control system 400*b* may not be in fluid communication with any components located in fuselage 130, thus isolating the effects of a hydraulic fluid leak to empennage 150.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
a body comprising a fuselage and an empennage;
a power train coupled to the body and comprising a power source;
a main rotor system in mechanical communication with the power train and located proximate to the fuselage, the main rotor system comprising a main rotor gear box and at least one main rotor blade in mechanical communication with the main rotor gear box;
a secondary rotor system in mechanical communication with the power train and located proximate to the empennage, the secondary rotor system comprising a secondary rotor gear box and at least one secondary rotor blade in mechanical communication with the secondary rotor gear box;
a main rotor control system located proximate to the fuselage and comprising:
at least one hydraulic pump located proximate to the fuselage; and
at least one hydraulic actuator located proximate to the fuselage and configured to adjust at least one operating characteristic of the at least one main rotor blade; and
a secondary rotor control system located proximate to the empennage and comprising:
at least one hydraulic pump located proximate to the empennage; and
at least one hydraulic actuator located proximate to the empennage and configured to adjust at least one operating characteristic of the at least one secondary rotor blade;
wherein the secondary rotor control system is in fluid communication with the secondary rotor gear-box such that the secondary rotor gear box provides hydraulic fluid to the secondary rotor control system.

2. The rotorcraft of claim 1, wherein the secondary rotor system comprises an anti-torque rotor system.

3. The rotorcraft of claim 1, wherein the main rotor control system is not in fluid communication with the secondary rotor control system.

4. The rotorcraft of claim 1, wherein an operating fluid pressure of the main rotor control system is higher than an operating fluid pressure of the secondary rotor control system.

5. The rotorcraft of claim 1, wherein the at least one hydraulic actuator of the secondary rotor control system is configured to adjust at least one operating characteristic of the at least one secondary rotor blade by adjusting a pitch angle of the at least one secondary rotor blade.

6. The rotorcraft of claim 1, further comprising at least one drive shaft extending from the secondary rotor system located proximate to the empennage to the main rotor system located proximate to the fuselage.

7. The rotorcraft of claim 6, wherein the at least one drive shaft mechanically couples the main rotor gear box and the secondary rotor gear box.

8. The rotorcraft of claim 1, wherein the secondary rotor control system is not in fluid communication with any components located in the fuselage.

9. A method, comprising:
providing a rotorcraft, comprising:
a body comprising a fuselage and an empennage;
a power train coupled to the body and comprising a power source;
a main rotor system in mechanical communication with the power train and located proximate to the fuselage, the main rotor system comprising a main rotor gear box and at least one main rotor blade in mechanical communication with the main rotor gear box;
a secondary rotor system in mechanical communication with the power train and located proximate to the empennage, the secondary rotor system comprising a secondary rotor gear box and at least one secondary rotor blade in mechanical communication with the secondary rotor gear box;
a main rotor control system located proximate to the fuselage and comprising:
at least one hydraulic pump located proximate to the fuselage; and
at least one hydraulic actuator located proximate to the fuselage; and
a secondary rotor control system located proximate to the empennage and comprising:
at least one hydraulic pump located proximate to the empennage and operable to provide a flow of hydraulic fluid;
at least one hydraulic actuator located proximate to the empennage configured to receive the provided flow of fluid and adjust an operating characteristic of the at least one secondary rotor blade based on the provided flow of hydraulic fluid, wherein the secondary rotor control system is in fluid communication with the secondary rotor gear box such that the secondary rotor gear box provides the flow of hydraulic fluid to the secondary rotor control system;
receiving an instruction to adjust the operating characteristic of the at least one secondary rotor blade of the secondary rotor system; and
changing, based on the received instruction, at least one aspect of the provided flow of fluid such that the at least one hydraulic actuator adjusts the operating characteristic of the at least one secondary rotor blade.

10. The method of claim 9, wherein receiving the instruction comprises receiving the instruction in the form of an electrical signal.

11. The method of claim 9, wherein receiving the instruction comprises receiving the instruction in the foal' of a mechanical input.

12. The method of claim 9, wherein the secondary rotor system comprises an anti-torque rotor system.

13. The method of claim 9, wherein the main rotor control system is not in fluid communication with the secondary rotor control system.

14. The method of claim 9, wherein an operating fluid pressure of the main rotor control system is higher than an operating fluid pressure of the secondary rotor control system.

15. The method of claim 9, wherein the at least one hydraulic actuator of the secondary rotor control system is configured to adjust at least one operating characteristic of the at least one secondary rotor blade by adjusting a pitch angle of the at least one secondary rotor blade.

\* \* \* \* \*